United States Patent [19]

Gradl et al.

[11] 4,346,066

[45] Aug. 24, 1982

[54] PURIFICATION OF WET-PROCESS PHOSPHORIC ACID

[75] Inventors: Reinhard Gradl, Hürth; Klaus Schrödter, Cologne; Klaus-Peter Ehlers, Erftstadt; Wolfgang Scheibitz, Frankfurt, all of Fed. Rep. of Germany

[73] Assignee: Hoechst Aktiengesellschaft, Fed. Rep. of Germany

[21] Appl. No.: 164,365

[22] Filed: Jun. 30, 1980

[30] Foreign Application Priority Data

Jul. 4, 1979 [DE] Fed. Rep. of Germany ....... 2926943

[51] Int. Cl.$^3$ .............................................. C01B 25/16
[52] U.S. Cl. ................................................. 423/321 S
[58] Field of Search .................. 423/320, 321 S, 321 R

[56] References Cited

U.S. PATENT DOCUMENTS 4,196,180 4/1980 Wojtech et al. ................. 423/321 S
4,200,620 4/1980 Ehlers et al. ..................... 423/321 S

FOREIGN PATENT DOCUMENTS 2127141 12/1971 Fed. Rep. of Germany .
1952104 1/1973 Fed. Rep. of Germany .
2321751 2/1976 Fed. Rep. of Germany .
2657189 6/1978 Fed. Rep. of Germany .

Primary Examiner—O. R. Vertiz
Assistant Examiner—Gregory A. Heller
Attorney, Agent, or Firm—Connolly and Hutz

[57] ABSTRACT

The invention relates to the decontamination of wet-processed phosphoric acid with the use of organic solvents in a plurality of extraction zones, of which each is comprised of a mixing zone and a separating zone, the solvent being immiscible or partially miscible with water. Resulting organic phase and the aqueous phase are contacted countercurrently with respect to one another, the organic solvent phase being dispersed in the aqueous phase. To this end, the invention provides for the aqueous phase to be admitted to the mixing zone at the onset of the extraction, and for organic phase and aqueous phase to be continuously admitted in a volume ratio of at least 2.5:1 to the respective extracting zones in an overall quantity sufficient to provide, in the mixing zones of the extraction zones, a volume ratio of organic phase to aqueous phase of at most 1:1, which is maintained therein.

9 Claims, No Drawings

PURIFICATION OF WET-PROCESS PHOSPHORIC ACID

The present invention relates to a process wherein an aqueous solution of wet-processed phosphoric acid is decontaminated with the use of an organic solvent in a plurality of extraction zones, of which each is comprised of a mixing zone and a separating zone, the solvent being immiscible or partially miscible with water. More particularly, resulting organic phase and the aqueous phase are contacted countercurrently with one another and decontaminated phosphoric acid is recovered from resulting organic extract, after separation of this latter from raffinate matter constituted by the aqueous phase not absorbed by the solvent.

It has already been described that wet-processed phosphoric acid can be decontaminated by extraction methods with the use of solvents of unlimited miscibility with water, or with the use of solvents which are immiscible with water.

The use of solvents of unlimited miscibility with water is however not fully satisfactory in respect of the following: Extracted matter is difficult to free from co-dissolved contaminants and free phosphoric acid is difficult to recover from the solvent and to recycle, once it has been separated in costly manner. It has therefore been customary for extracted matter, for example, to be admixed with a concentrated base to effect the separation of phosphoric acid in the form of its alkali metal or ammonium salts. A process of this kind has already been described in German patent specification "Auslegeschrift" No. 1 952 104, for example.

The following adverse effect has been found to be associated with the use of solvents immiscible with water. As a result of the low distribution coefficient of phosphoric acid, it is necessary for solvent and acid to be used in a great ratio and for the extraction to be effected in a plurality of stages, in order to obtain satisfactory yields of extracted matter. In addition to this, the extraction method just described normally gives very dilute pure acid which must generally be concentrated for further use, with heavy expenditure of energy.

Solvents partially miscible with water have also been used as phosphoric acid extractants. German patent specification "Auslegeschrift" No. 2 127 141, for example, discloses the extraction with the use of solvents which contain 40 to 50% less water than would correspond to saturation therewith. In this case, the distribution coefficient of phosphoric acid compares favorably with that determined in a water-saturated alcohol. Despite this, it is necessary for the extraction to be effected in a plurality of stages and for acid and solvent to be used in the wide ratio of 12:1 to 28:1, in order to obtain high yields of desirable product.

As described in German patent specification "Auslegeschrift" No. 2 321 751, it is possible to avoid the adverse effects referred to hereinabove. To this end, it is necessary for the solvents which are capable of absorbing phosphoric acid and in which water is partially soluble to be used in anhydrous form.

The process just described provides for the contaminants which are contained in wet-processed phosphoric acid to be salted out. To this end, the organic solvent is used at least in a quantity necessary to ensure the dissolution, therein, of the phosphoric acid being contained in the wet-processed matter, and of chemically uncombined water. Depending on the concentration of the crude acid used in each particular case, solvent and acid are employed in a ratio as low as 9.2:1 to 2.5:1, the phosphoric acid being extracted in countercurrent fashion, in at most two stages.

Despite this, the process just described is also not fully satisfactory: Depending on the crude acid used, the extraction residue with the contaminants therein is obtained in the form of viscous or solid material which is difficult to handle and has solvent occluded therein.

To avoid these adverse effects, the process described in German patent specification "Offenlegungsschrift" No. 2 657 189 provides for wet-processed phosphoric acid to be extracted with the aid of a solvent saturated with water to an extent of more than 0 and less than 50% the saturation concentration, the solvent being used in admixture with a quantity of mineral acid which, in moles, corresponds to the proportion of cation-linked phosphate in the crude acid. Common to all of the processes referred to hereinabove is the following adverse effect which is liable to entail considerable disturbances during commercial operation.

Depending on the $P_2O_5$-content of the crude acid and the kind and quantity of contaminants contained therein, especially calcium, magnesium, aluminum and iron compounds, and depending on the water-content of the solvent, the multistage extraction of phosphoric acid is liable, especially in the event of high $P_2O_5$-yields being desirable, to entail the deposition to a more or less serious extent of solid matter in the two phases, especially on apparatus surfaces which come into contact therewith.

The depositing material which consists essentially of calcium sulfate in anhydrous or hydrous form, and/or sodium hexafluorosilicate is, however, liable to result in pipelines, especially inlet and overflow pipes, becoming clogged and in mixing and transporting mechanisms becoming encrusted therewith. This in turn has been found (a) adversely to effect the mixing efficiency and in the end to impair the yield of desirable $P_2O_5$;

(b) to soil measuring instruments and in the end to effect reliable operation; and (c) invariably to effect operational standstill by breakdown of transporting mechanisms.

Needless to say, this results in frequent production stoppages which entail considerable expense for cleaning operations and affect commercial attractiveness.

It is therefore an object of the present invention to provide a process permitting wet-processed phosphoric acid to be decontaminated under conditions which (a) ensure an optimum yield of $P_2O_5$;

(b) just permit a minimum of contaminants to go forward into the organic phase;

(c) avoid encrustation during the extraction by crystallizing compounds; and (d) ensure the formation of easy-to-handle raffinates.

To achieve this, the present invention now unexpectedly provides an improved process for extracting wet-processed phosphoric acid with the use of an organic solvent immiscible or only partially miscible with water; the improved process comprising: at the onset of the extraction, introducing the aqueous phase into the mixing zone of the respective extracting zone and dispersing the organic solvent phase in the aqueous phase; during the extraction, introducing continuously the organic phase and aqueous phase in a volume ratio of at least 2.5:1, preferably 4:1 to 8:1, into the respective extraction zones in an overall quantity sufficient to provide, in the mixing zones of the extraction zones, a volume ratio of organic phase to aqueous phase of at most 1:1, preferably 4:6 to 2:8; and maintaining this volume ratio therein.

A preferred feature of the invention provides for aqueous phase coming from the respective separating zone to be recycled to the mixing zone forming part of the extraction zone. A further preferred feature provides for the organic solvent to be used in admixture with a mineral acid, preferably sulfuric acid, the mineral acid being employed in a quantity equivalent to the cation-linked proportion of phosphoric acid in the phosphoric acid solution.

A still further preferred feature provides for the organic solvents to comprise anhydrous, partially or completely water-saturated $C_5$-alcohols and for the wet-processed phosphoric acid solution to contain 40 to 55 weight% $P_2O_5$.

The quantity of solvent which is to be used depends on the water content of the solvent and the $P_2O_5$-concentration in the crude wet-processed phosphoric acid. The solvent(s) is (are) used in quantities increasing with a decreasing $P_2O_5$-concentration of the acid and with an increasing water-content. In the event of an anhydrous $C_5$-alcohol being used as the solvent and in the event of the acid containing between 40 to 55 weight% $P_2O_5$, for example, it is good practice to use 5.5 to 2.5 parts by volume alcohol per part by volume acid. In the event of the alcohol being a water-saturated alcohol and in the event of the acid containing 40 to 55 weight% $P_2O_5$, it is good practice to use 6.0 to 8.2 parts by volume alcohol per part by volume acid. The extraction should conveniently be effected at temperatures within the range 0° to 98° C., preferably 20° to 50° C., in countercurrent fashion in altogether 4 to 10 stages, preferably 5 to 8 stages.

The basic idea underlying our present extraction process resides in the use of the aqueous phase as the continuous phase which has the organic solvent dispersed therein. As a result, and this is in clear contrast with customary liquid-liquid extraction, the exchange of constituents occurs in the present process from the continuous into the disperse phase (cf. P. J. Bailes, C. Hanson, M. A. Hughes, "Chemical Engineering," Jan. 1976, pages 86 to 100).

As described hereinabove, the overall volume proportion of solvent admitted to the system during extraction is larger than the proportion of phosphoric acid. Despite this, the present invention permits an excess of stationary aqueous phase to be established and maintained in the mixing zone forming part of the extraction zone.

The two phases can be mixed together by any known method which permits two liquid phases to be dispersed in one another, the aqueous phase to be maintained as the continuous phase and, after exchange of the constituents, the phases to be separated from one another in known manner.

The present process offers the following completely unexpected beneficial effects which would not have been expected by the artisan.

(a) $P_2O_5$ is obtained in yields higher than with the use of a customary dispersion, i.e. with the use, as continuous phase, of organic phase having the aqueous phase dispersed therein.

This was proved by two extraction tests made on wet-processed phosphoric acid under identical conditions (extraction stages and quantitative ratios) save that the continuous phase once was aqueous phase, which had the organic phase dispersed therein, and once was organic phase which had the aqueous phase dispersed therein. Depending on the test conditions selected ($P_2O_5$-concentration of crude acid, quantity, nature and water-content of solvent), $P_2O_5$ *l was extracted in the first case in yields* 1.0 to 2.5% higher than in the second case.

(b) Reliable undisturbed operation

The present process reliably avoids encrustation by crystallizing compounds. Solid material which may be formed is not liable to deposit on container walls or inserts as it remains suspended in the aqueous phase and is accordingly easy to remove together with raffinate matter.

As a result, cleaning operations are rendered unnecessary or are reduced to a minimum without the need to stop production. Extracted $P_2O_5$ is obtained in high constant yields. Measuring instruments remain operational and ensure reliable operation.

The aqueous phase with the contaminants therein, which are to be removed, is readily transportable by means of pumps, for example, and easy to free from occluded solvent, if any, by distillative treatment.

(c) Improved coalescence behaviour of mixture

The two liquids mixed together show an extremely sharp separation line on coalescence.

As a result, it is possible for the position of the phases' interfacial surface areas to be readily controlled and regulated by means of simple mechanical, optical or acoustic measuring methods.

(d) Low entrainment

The present process permits entrainment, i.e. the carrying along of one phase into the other, especially the carrying along of droplets of the more dense into the less dense phase, to be practically avoided. As a result, stage efficiency is improved as compared with customary dispersing methods at identical throughput rates, or throughput rate is improved with use of identical number of extraction stages.

The non-occurrence of entrainment has a further beneficial effect, namely that resulting extract is less seriously contaminated than heretofore so that it can be directly subjected to further processing treatment.

(e) Improved separation of organic contaminants

As a further benefical effect, the present process permits organic contaminants originating from the crude acid to be retained predominantly in the aqueous phase and to be readily removed therewith. In the inverse case, the organic contaminants are predominantly in the organic phase so that flocculation is liable to occur. This is a phenomenon which in the end may entail increased entrainment or affect the extraction efficiency and purity of the recovered acid.

The following Examples illustrate the invention which is, however, not limited thereto:

EXAMPLE 1

The starting material was commercial crude phosphoric acid which had been prepared from Morocco phosphate, contained 50 weight% of $P_2O_5$ and the following principal contaminants, based on $P_2O_5$: Fe=4070 ppm; Al=2200 ppm; Mg=8640 ppm; Ca=2500 ppm; V=460 ppm; Mn=80 ppm; $SO_4$=0.15% (ppm stands for part per million).

1 l/h of the above crude acid and 250 ml/h of recycled scrubbing solution were extracted in a 5-stage countercurrent extraction with 6 l/h of pure anhydrous n-amyl alcohol which contained 60 ml of concentrated sulfuric acid (corresponding to 1.12 mol cation-linked $H_3PO_4$). First introduced into the mixing zone was the aqueous phase and the organic phase was dispersed therein. 423.1 g/h of raffinate containing 2.55% $P_2O_5$ was obtained. The total loss, based on $P_2O_5$ in the crude acid was 1.4%. Organic phase and aqueous phase were used in a volume ratio of 25:75.

During the 24-hour test, all apparatus parts, agitators and insert members which came into contact with the product, remained free from incrustations. The raffinate had a very good flowability so that it could readily be transported by means of a piston dosing pump and was easy to free, in a sieve plate column, from occluded solvent by countercurrent steam distillation.

EXAMPLE 2

(Comparative Example)

The test of Example 1 was repeated. Apparatus and quantities of material were the same, but the mixing zone was not filled with aqueous phase which was dispersed in the organic phase as the continuous phase.

After 18 hours, the agitator of extraction stage 4 was so heavily incrusted with material that it was necessary for it to be cleaned.

The yield of $P_2O_5$, based on the $P_2O_5$ in the crude acid, was reduced from 98.6% (in Example 1) to 97.4%. The resulting extract contained the $C_{org.}$ contaminants originating from the crude acid in the form of a flocculent voluminous precipitate. It was necessary for it to be separated in a settling tank prior to subjecting the extract to further processing treatment.

EXAMPLE 3

1.5 l/h of crude phosphoric acid, which was prepared from Khouribga phosphate and contained 46.2% of $P_2O_5$, was treated in countercurrent fashion with 7.2 times its volume of a mixture of 75% n-amyl alcohol and 25% isoamyl alcohol originating from an oxo-synthesis reaction, the mixture containing 76.5 ml of sulfuric acid. The alcohol contained 5.5% of water. The extraction was effected in a commercial (Kühni) column with an internal diameter of 60 mm and provided with 30 practical trays (=about 6 theoretical trays). The active column portion, i.e. its mixing zone, was filled with crude acid and the organic phase was dispersed therein. The phase separating layer was in the lower third portion of the upper separating zone. The shaft of the agitator, which had a diameter of 40 mm, was caused to rotate at a speed of 300 $min^{-1}$. Organic phase and aqueous phase were used in the mixing zone in a ratio by volume of 30:70. 1.17 kg/h of raffinate which contained 124.5 g $P_2O_5$ was obtained. The total loss of $P_2O_5$, based on the $P_2O_5$ in the crude acid, was 2.4%.

After operation for 8 hours, column and measuring instruments were found to be practically free from incrustation. Operation remained undisturbed.

EXAMPLE 4

(Comparative Example)

The test of Example 3 was repeated. Feed materials and quantitative ratios were the same but the column's active portion was filled with solvent and the phase boundary line was maintained in the lower separating zone. In other words, the aqueous phase was dispersed in the organic phase and the solvent was used as the continuous phase. Organic phase and aqueous phase were used in a ratio by volume of 90:10, in the mixing zone. 3.8% of $P_2O_5$, based on $P_2O_5$ in the crude acid, was lost. During the test, agitator and inserts became considerably encrusted. The bottom outlet valve for raffinate removal was required to be cleaned within 2 hour intervals.

EXAMPLE 5

1 l/h of crude phosphoric acid which was prepared from South African (Phalaborwa) phosphate, was extracted with 8.2 l/h of water-saturated amly alcohol admixed with 40 m/l of concentrated sulfuric acid in an 8-stage countercurrent apparatus of which the mixing zone had been filled previously with aqueous phase and in which organic phase and aqueous phase were maintained in a ratio by volume of 35:65. In other words, the aqueous phase was the continuous phase and organic phase was dispersed therein. Decontaminated $P_2O_5$ was obtained in a yield of 95 weight%. The resulting extract was almost colorless and free from entrainment.

EXAMPLE 6

(Comparative Example)

The test of Example 5 was repeated save that the aqueous phase was dispersed in the organic phase and that a ratio by volume (organic to aqueous phase) of 88:12 was maintained in the mixing zone. The $P_2O_5$—yield was reduced to 92.5 weight%, based on the $P_2O_5$ used. The extract coming from the first stage contained considerable proportions of organic contaminants and had a distinct yellow to brown coloration. 1.5 volume% was entrainment so that it was necessary for aqueous phase to be separated prior to subjecting the extract to further processing treatment.

We claim:

1. In the process for purifying an aqueous solution of phosphoric acid which comprises the steps of extracting countercurrently with respect to each other an organic solvent and an aqueous phosphoric acid solution with the resulting formation of an organic and an aqueous phase, in a plurality of extraction zones each consisting of a mixing zone and a separating zone, said organic solvent being immiscible or partially miscible with water, separating an organic phosphoric acid extract obtained from a remaining aqueous raffinate, and recovering purified phosphoric acid from the organic phosphoric acid extract, the improvement which comprises using the aqueous phase as the continuous phase and dispersing therein the organic phase by filling the mixing zones with the aqueous phase prior to starting the extraction, feeding continuously to said extraction zones the organic solvent and the phosphoric acid solution in a volume ratio of at least 2:5 to 1, and providing and maintaining within the mixing zones of said extraction zones the organic and the aqueous phase at a volume ratio of at most 1 to 1.

2. The process as claimed in claim 1, wherein the organic phase and aqueous phase are admitted continuously to the extraction zones in a volume ratio of 4:1 to 8:1.

3. The process as claimed in claim 1, wherein the organic solvent and the aqueous wet-processed phosphoric acid solution are admitted to the extraction zones in an overall quantity sufficient to establish and maintain in the mixing zones of the extraction zones a volume ratio of organic phase to aqueous phase within the range 4:6 to 2:8.

4. The process as claimed in claim 1, wherein aqueous phase coming from the respective separating zones is recycled to the mixing zones of the respective extraction zones.

5. The process as claimed in claim 1, wherein the organic solvent is used in admixture with a quantity of sulfuric acid at least equivalent to the cation-linked proportion of phosphoric acid contained in the phosphoric acid solution.

6. The process as claimed in claim 1, wherein the organic solvent is an alcohol with 5 carbon atoms.

7. The process as claimed in claim 1, wherein the wet-processed phosphoric acid contains 40 to 55 weight% of $P_2O_5$.

8. The process for purifying an aqueous solution of phosphoric acid as claimed in claim 1, wherein the organic solvent is 2.5 to 5.5 parts by volume of an anhydrous $C_5$-alcohol or 6.0 to 8.2 parts by volume of a water-saturated $C_5$-alcohol per part by volume of wet-processed phosphoric acid having a $P_2O_5$-content of 40 to 55 weight%.

9. A process for purifying a contaminated aqueous phase containing wet-processed phosphoric acid in a plurality of countercurrent extraction zones each having a mixing zone and a separating zone, said process comprising the steps of:

(a) at the onset of the countercurrent extraction introducing the aqueous phase into a said mixing zone of a said countercurrent extraction zone to establish a continuous aqueous phase in the mixing zone and dispersing a predominantly organic solvent phase in the continuous aqueous phase to form a dispersed organic solvent phase in the continuous aqueous phase in the mixing zone, said predominantly organic solvent phase comprising a liquid organic solvent which is immiscible or partially miscible in water, and feeding continuously to the countercurrent extraction zone the predominantly organic solvent phase and the aqueous phase in a volume ratio of at least 2.5:1 and providing and maintaining within the mixing zone a stationary aqueous phase which is at least as large in volume as the organic solvent phase;

(b) extracting in said mixing zone, phosphoric acid from said continuous aqueous phase with said dispensed organic solvent phase, whereby phosphoric acid, and a relatively minimal amount of the contaminants contaminating said aqueous phase pass into said dispersed organic solvent phase to form an organic phosphoric acid extract phase and thereby to leave behind an aqueous raffinate; and (c) separating in the separating zone of the countercurrent extraction zone of step (a) the organic phosphoric acid extract phase from the aqueous raffinate phase, whereby purified phosphoric acid can be recovered from the organic phosphoric acid extract phase.

* * * * *